United States Patent Office 3,282,950
Patented Nov. 1, 1966

3,282,950
SUBSTITUTED 5-IMINO-1,2,4-THIADIAZOLIDIN-3-ONES AND PROCESS THEREFOR
Gerhard F. Ottmann, Hamden, and Haywood Hooks, Jr., West Haven, Conn., assignors to Olin Mathieson Chemical Corporation, New Haven, Conn., a corporation of Virginia
No Drawing. Filed Jan. 21, 1965, Ser. No. 427,084
8 Claims. (Cl. 260—306.7)

This invention relates to a series of substituted 5-imino-1,2,4-thiadiazolidin-3-ones, and more particularly it relates to cyclic derivatives having the following general formula:

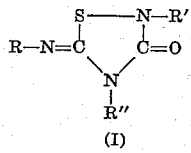

(I)

where both R and R' are either alkyl, cycloalkyl, aryl, substituted aryl or benzyl, and wherein R" is either hydrogen, alkyl, aryl or substituted aryl.

It has recently been established that S-chloro isothiocarbamyl chlorides react with a wide variety of isocyanates to provide S-[N'-(chlorocarbonyl)-amino] isothiocarbamyl chlorides, and the preparation of these latter derivatives is thoroughly described and disclosed in our copending U.S. application Serial No. 411,638, filed November 16, 1964. These reactions proceed in accordance with the following equation wherein R and R' are as represented in the preceding discussion.

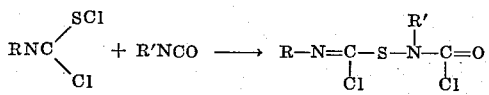

It has now been found that the heretofore unknown cyclic derivatives (I) are provided in high yield and purity by the reaction of the S-[N'(chlorocarbonyl)-amino] isothiocarbamyl chlorides with ammonia and primary amines. An efficient process for the preparation of the compounds (I) has been provided and is disclosed herein. The substituted 5-imino-1,2,4-thiadiazolidin-3-ones (I) are prepared in accordance with the following equation.

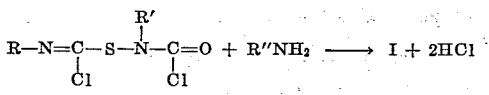

Although the cyclic derivatives (I), wherein R and R' are as previously represented, are readily prepared in accordance with the disclosure herein, preferred embodiments of this invention include those compounds of the general Formula I wherein both R and R' are independently selected from the class consisting of alkyl having 1–18 carbon atoms, cycloalkyl having 5–7 carbon atoms, aryl having 6–10 carbon atoms, halogenated phenyl, nitrated phenyl, benzyl and phenyl having a lower alkoxy (1–3 carbon atoms) substituent. The preparation of the particular S-[N'(chlorocarbonyl)-amino] isothiocarbamyl chlorides, which can be reacted with ammonia and primary amines to provide substituted 5-imino-1,2,4-thiadiazolidin-3-ones (I) wherein R and R' have these preferred definitions, is described in detail in our copending U.S. application S.N. 411,638.

The reaction of the S-[N'(chlorocarbonyl)-amino] isothiocarbamyl chlorides with ammonia and primary amines is a general one. Thus cyclic derivatives of the Formula I wherein R" represents a wide variety of substituents are provided in accordance with this invention. However, preferred embodiments include those cyclic compounds wherein R" represents hydrogen, alkyl having 1–18 carbon atoms, and aryl having 6–10 carbon atoms. These are readily prepared by reacting the chlorides with ammonia and primary amines of the type R"NH$_2$ such as methylamine, ethylamine, butylamine, dodecylamine and the like. Similarly primary amines such as aniline, tolylamine, naphthylamine and the like are preferred reactants in the preparation of the compounds (I). Many other primary amines can be utilized in the reactions with the chlorides to provide derivatives included in the Formula I. Among these latter compounds are various halogenated anilines, nitrated anilines, and alkoxy substituted anilines. The use of these reactants provides cyclic derivatives (I) wherein R" is a substituted aryl moiety.

The process of this invention comprises reacting the S-[N'(chlorocarbonyl)-amino] isothiocarbamyl chlorides with ammonia or primary amines in the presence of an inert organic diluent. Depending on the particular reactants and solvents employed for any particular reaction, a wide range of temperature conditions may be utilized, but in general the process of this invention is carried out at a temperature range of about −10° C. to about 100° C. and preferably at a range of 0° C.–35° C.

A hydrogen chloride acceptor is preferably employed in the practice of this invention in order to obtain the optimum yields of the desired products. A molar excess of the ammonia or primary amine reactant may be conveniently employed as an acceptor for the two moles of hydrogen chloride evolved in the process. Alternatively, equimolar amounts of the chloride reactant and the ammonia or primary amine may be utilized with the evolved hydrogen chloride being taken up by an organic hydrogen halide acceptor such as a tertiary amine. Suitable in this regard are tertiary amines such as triethylamine, tributylamine, N-alkyl substituted morpholines and the like.

A number of suitable inert organic diluents may be used in the practice of this invention, but in general aliphatic and aromatic hydrocarbons, ethers and chlorinated hydrocarbons are preferably utilized. Illustrative of some of the preferred diluents are pentane, hexane, benzene, toluene, the various xylenes, diethyl ether and carbon tetrachloride.

Upon completion of the reaction, the hydrochloride salts are conveniently removed from the reaction mixture by washing or filtration procedures. The residual organic material can then be worked up to provide the desired products (I) by conventional procedures including extraction, distillation and crystallization techniques.

The substituted 5-imino-1,2,4-thiadiazolidin-3-ones of this invention are useful agricultural chemicals. They have shown considerable activity as nematocides, but they are particularly valuable post-emergence herbicides. In this respect they are quite effective in controlling many broadleaf and grassy weeds. For instance, they are effectively employed in controlling crab grass, rye grass, mustard and pigweed. Furthermore, it has been found that they are not phytotoxic to several crops including cotton, and thus they can be selectively employed in post-emergence treatment to control the growth of a variety of noxious weeds in the vicinity of a cotton crop. In this application, the thiadiazolidin-3-one (I) active ingredients are preferably applied to the area to be protected in the form of spray suspensions or dispersions.

The following examples will serve to illustrate the preparation of several of the substituted 5-imino-1,2,4-thiadiazolidin-3-ones (I) in accordance with this invention.

*Example 1*

An amount of 45 g. of N-cyclohexyl S-[N'-(chlorocarbonyl)-isopropylamino] isothiocarbamyl chloride was dispersed in 200 ml. of dry toluene. To this vigorously stirred mixture was added dropwise over a period of 1.5 hours a solution of 42.5 g. of aniline in 45 ml. of toluene. A reaction temperature of between 10° and 15° C. was maintained by means of an external cooling bath. After stirring overnight, the precipitated aniline hydrochloride was removed by filtration, and the filtrate was freed from solvent by distillation in vacuo. The residue was washed with a small amount of cold ether and then purified by recrystallization from 250 ml. of n-hexane affording 31 g. of 5-cyclohexylimino-2-isopropyl-4-phenyl-1,2,4-thiadiazolidin-3-one, M.P. 101°–102° C., in the form of bulky glossy crystals.

Analysis.—Calcd. for $C_{17}H_{23}N_3OS$: C, 64.33; H, 7.25; N, 13.24; S, 10.08.  Found: C, 65.59; H, 7.44; N, 13.22; S, 10.38.

Example 2

An amount of 40.0 g. of N-ethyl S-[N'-(chlorocarbonyl)-octylamino] isothiocarbamyl chloride was dispersed in 200 ml. of dry toluene. A solution of 30.0 g. of butylamine in 30 ml. of dry toluene was added dropwise and with stirring over a period of one hour. The very exothermic reaction was moderated by use of an external cooling bath. The temperature of the reaction mixture was thus maintained at between 20° and 25° C. After stirring overnight, butylamine hydrochloride was removed by filtration, and the filtrate was concentrated in vacuo yielding a straw yellow oil which was purified by distillation in vacuo. Yield: 31.0 g. of 5-ethylimino-2-octyl-4-butyl-1,2,4-thiadiazolidin-3-one, B.P. 149° C./0.25 mm., $n_D^{25}$ 1.4941.

Analysis.—Calcd. for $C_{16}H_{31}N_3OS$: C, 61.32; H, 9.98; N, 13.40; S, 10.21.  Found: C, 60.97; H, 9.98; N, 13.13; S, 10.18.

Example 3

Monomethylamine was passed into a slurry of 40.0 g. of N-butyl S-[N'-(chlorocarbonyl)-butylamino] isothiocarbamyl chloride in 200 ml. of dry toluene. The exothermic reaction was kept at 20°–25° C. by means of external cooling. The reaction was completed after 2.5 hours when methylamine was no longer consumed. The precipitate—methylamine hydrochloride—was removed by filtration, and the filtrate was distilled yielding 26.0 g. of 5-butylimino-2-butyl-4-methyl-1,2,4-thiadiazolidin-3-one, B.P. 110° C./0.05 mm., $n_D^{25}$ 1.5060, in the form of a slightly yellow liquid.

Analysis.—Calcd. for $C_{11}H_{21}N_3OS$: C, 54.29; H, 8.71; N, 17.35; S, 13.15.  Found: C, 53.90; H, 9.09; N, 17.07; S, 13.15.

Example 4

An amount of 49.0 g. of N-phenyl S-[N'-(chlorocarbonyl)-p-chloroanilino] isothiocarbamyl chloride was dispersed in 200 ml. of dry toluene and 41.8 g. of aniline dissolved in 50 ml. of toluene was added dropwise with stirring over a period of one hour. The reaction which is exothermic was moderated by an external cooling bath to 10° C. When the addition was completed, the reaction mixture was stirred for two additional hours and then filtered. The filtrate was concentrated to yield a brown viscous oil which after washing with cold methanol afforded a slightly yellow colored solid. It was recrystallized from 150 ml. of methanol using activated charcoal for discoloration to afford 18 g. of 5-phenylimino-2-(p-chlorophenyl)-4-phenyl-1,2,4-thiadiazolidin-3-one, M.P. 134°–135° C.

Analysis.—Calcd. for $C_{20}H_{14}ClN_3OS$: N, 11.08; Cl, 9.35.  Found: N, 11.17; Cl, 8.97.

What is claimed is:

1. Substituted 5-imino-1,2,4-thiadiazolidin-3-ones having the formula

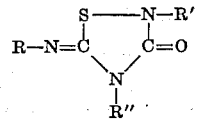

wherein
R is alkyl having 1–18 carbon atoms, cycloalkyl having 5–7 carbon atoms, halogenated phenyl, nitrated phenyl, benzyl or phenyl having a lower alkoxy substituent;
R' is alkyl having 1–18 carbon atoms, cycloalkyl having 5–7 carbon atoms, aryl having 6–10 carbon atoms, halogenated phenyl, nitrated phenyl, benzyl or phenyl having a lower alkoxy substituent; and
R" is alkyl having 1–18 carbon atoms or aryl having 6–10 carbon atoms.

2. The compounds of claim 1 wherein R, R', and R" are each alkyl having 1–18 carbon atoms.

3. 5-ethylimino-2-octyl-4-butyl-1,2,4-thiadiazolidin-3-one.

4. 5-butylimino-2-butyl-4-methyl-1,2,4-thiadiazolidin-3-one.

5. Substituted 5-imino-1,2,4-thiadiazolidin-3-ones having the formula

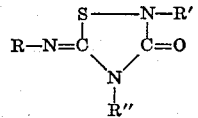

wherein R and R" are each aryl having 6–10 carbon atoms and R' is halogenated phenyl.

6. 5-phenylimino-2-(p-chlorophenyl)-4-phenyl-1,2,4-thiadiazolidin-3-one.

7. A process for preparing substituted 5-imino-1,2,4-thiadiazolidin-3-ones which comprises reacting S-[N'-(chlorocarbonyl)-amino] isothiocarbamyl chlorides with a compound selected from the class consisting of ammonia and primary amines in the presence of an inert organic diluent.

8. The process of claim 7 wherein a reaction temperature range of about −10° C. to about 100° C. is employed.

References Cited by the Examiner

Joshua, Indian J. Chem., vol. 1, pages 391–4 (1963).
Kurzer, J. Chem. Soc. (London), 1962, pages 4191–4200.

ALEX MAZEL, Primary Examiner.

HENRY R. JILES, Examiner.

ALTON D. ROLLINS, Assistant Examiner.